(12) United States Patent
Lee et al.

(10) Patent No.: US 8,292,447 B2
(45) Date of Patent: Oct. 23, 2012

(54) BACKLIGHT UNIT AND DISPLAY APPARATUS HAVING THE SAME

(75) Inventors: Kum Tae Lee, Seoul (KR); Moon Jeong Kim, Seoul (KR); Duk Hyun Yun, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/210,690

(22) Filed: Aug. 16, 2011

(65) Prior Publication Data

US 2012/0014092 A1 Jan. 19, 2012

(30) Foreign Application Priority Data

Aug. 17, 2010 (KR) .................. 10-2010-0079538
Aug. 17, 2010 (KR) .................. 10-2010-0079539

(51) Int. Cl.
G09F 13/04 (2006.01)

(52) U.S. Cl. .............. 362/97.1; 362/97.2; 362/97.3; 362/97.4; 362/633; 362/632

(58) Field of Classification Search ......... 362/97.1–97.4
See application file for complete search history.

(56) References Cited

U.S. PATENT DOCUMENTS

| | | | |
|---|---|---|---|
| 7,121,692 B2 * | 10/2006 | Yu et al. ................ | 362/330 |
| 7,721,672 B2 * | 5/2010 | Nakano et al. .......... | 116/288 |
| 7,780,306 B2 * | 8/2010 | Hoshi ...................... | 362/97.1 |
| 7,980,718 B2 * | 7/2011 | Takata ..................... | 362/97.3 |
| 2002/0097354 A1 * | 7/2002 | Greiner .................... | 349/61 |
| 2007/0086179 A1 * | 4/2007 | Chen et al. .............. | 362/27 |
| 2011/0304796 A1 * | 12/2011 | Lee et al. ................ | 349/62 |

FOREIGN PATENT DOCUMENTS

| | | | |
|---|---|---|---|
| EP | 1867916 A1 * | 12/2007 | |
| JP | 2005-353498 A | 12/2005 | |
| JP | 2006-236701 A | 9/2006 | |
| JP | 2010-161029 A | 7/2010 | |
| KR | 10-2007-0066100 A | 6/2007 | |
| KR | 10-2007-0069227 A | 7/2007 | |
| KR | 10-2008-0062093 A | 7/2008 | |
| KR | 10-2009-0121926 A | 11/2009 | |
| KR | 10-2010-0054209 A | 5/2010 | |
| KR | 10-2010-0080079 A | 7/2010 | |

\* cited by examiner

*Primary Examiner* — Stephen F Husar
*Assistant Examiner* — James Cranson, Jr.
(74) *Attorney, Agent, or Firm* — KED & Associates, LLP

(57) ABSTRACT

Disclosed is a backlight unit. The backlight unit includes a bottom frame having a bottom surface and a sidewall, a plurality of light emitting diodes defining a plurality of light emitting areas, at least one module substrate provided on the bottom surface of the bottom frame to support at least one light emitting diode and including a connector to supply external power to the light emitting diode, and a integrated light guide plate to bury the light emitting diode therein and provided at the light emitting areas corresponding to one screen image. Dark lines are prevented in the light guide plate and a slim backlight unit is obtained by forming a integrated light guide plate corresponding to a screen image of the display panel in the backlight unit driven by dividing the light emitting areas.

19 Claims, 13 Drawing Sheets

BACKLIGHT UNIT AND DISPLAY APPARATUS HAVING THE SAME

BACKGROUND

The embodiment relates to a backlight unit. In particular, the embodiment relates to a backlight unit including a light emitting diode.

A light emitting diode (LED) may constitute a light emitting source by using GaAs, AlGaAs, GaN, InGaN, and InGaAlP-based compound semiconductor materials.

Such an LED is packaged so as to be used as a light emitting device that emits lights having various colors. The light emitting device is used as a light source in various products such as a lighting indicator, a character indicator, and an image indicator.

SUMMARY

The embodiment provides a backlight unit having a novel structure.

The embodiment provides a slim backlight unit.

The embodiment provides a backlight unit that can employ a division driving scheme.

According to the embodiment, there is provided a backlight unit including a bottom frame having a bottom surface and a sidewall, a plurality of light emitting diodes defining a plurality of light emitting areas, at least one module substrate provided on the bottom surface of the bottom frame to support at least one light emitting diode and including a connector to supply external power to the light emitting diode, and a integrated light guide plate to bury the light emitting diode therein and provided at the light emitting areas corresponding to one screen.

According to the embodiment, dark lines can be prevented in the light guide plate and a slim backlight unit can be obtained by forming a integrated light guide plate corresponding to a screen of the display panel in the backlight unit driven by dividing the light emitting areas.

In addition, according to the embodiment, a division driving scheme such as a local dimming driving scheme or an impulsive driving scheme is used, so that not only can power consumption be reduced, but the image quality of the display apparatus can be improved by enhancing the contrast of the screen.

In addition, the integrated light guide can be formed, so that the manufacturing cost can be reduced, and various module substrates can be provided to support the light emitting diodes, so that the assembling process can be easily performed or the backlight unit can be easily driven.

DETAILED DESCRIPTION OF THE EMBODIMENTS

Figure 1:
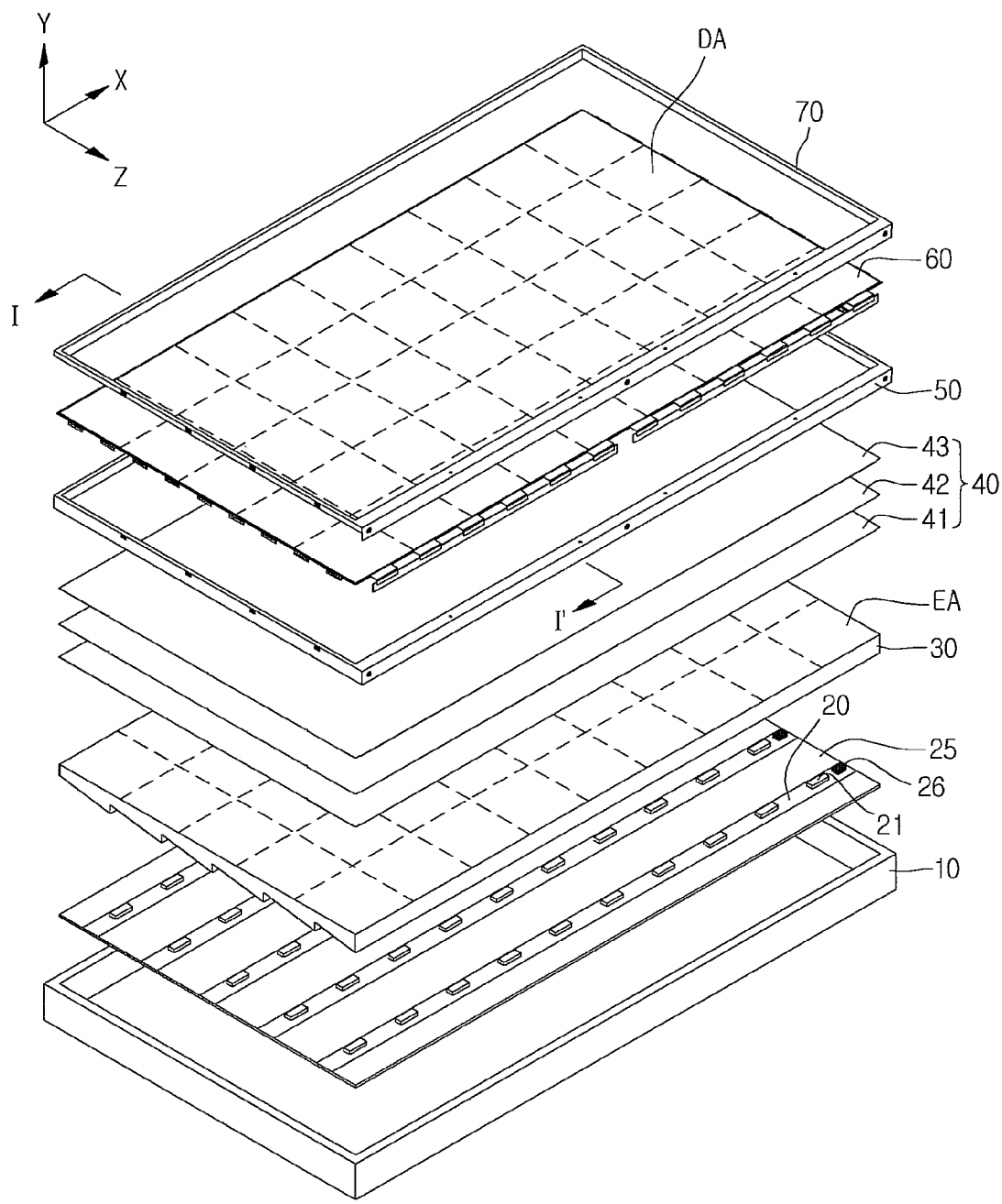
FIG. 1 is an exploded perspective view showing the display apparatus according to a first embodiment.

Hereinafter, embodiments will be described in detail with reference to accompanying drawings so that those skilled in the art can easily work with the embodiments. However, the embodiments may have various modifications.

In the following description, when a predetermined part "includes" a predetermined component, the predetermined part does not exclude other components, but may further include other components if there is a specific opposite description.

The thickness and size of each layer shown in the drawings may be exaggerated, omitted or schematically drawn for the purpose of convenience or clarity. In addition, the size of elements does not utterly reflect an actual size. The same reference numbers will be assigned the same elements throughout the drawings.

In the description of the embodiments, it will be understood that, when a layer (or film), a region, or a plate is referred to as being "on" or "under" another layer (or film), another region, or another plate, it can be "directly" or "indirectly" on the other layer (or film), region, plate, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size. The same reference numerals will be assigned to the same elements in the following description.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

According to a display apparatus of the embodiments, a light guide plate constituting a backlight unit performing a division driving scheme is formed as one body corresponding to the whole screen of a display panel.

Hereinafter, a display apparatus according to a first embodiment will be described with reference to FIGS. 1 to 5.

Figure 2:
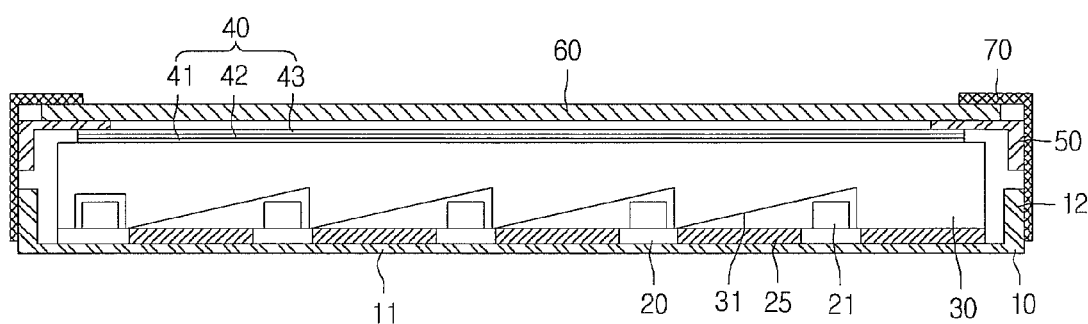
FIG. 2 is a sectional view showing the display apparatus taken along line I-I' of FIG. 1.
Figure 3:
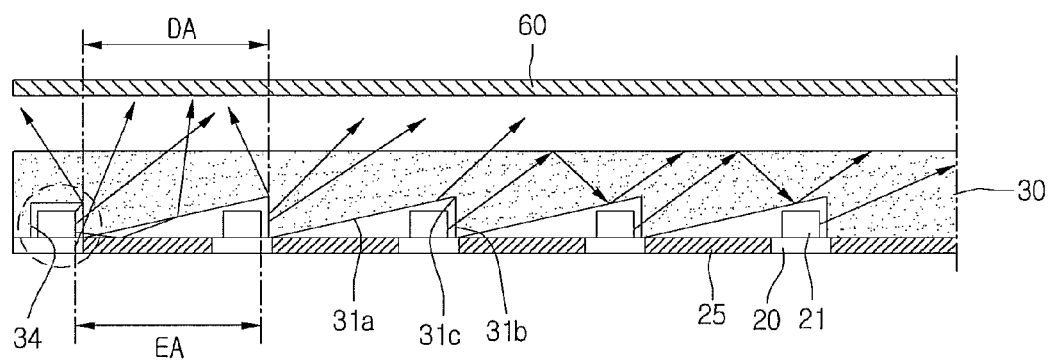
FIG. 3 is a sectional view showing a simplified structure of the display apparatus of FIG. 2.
Figure 4:
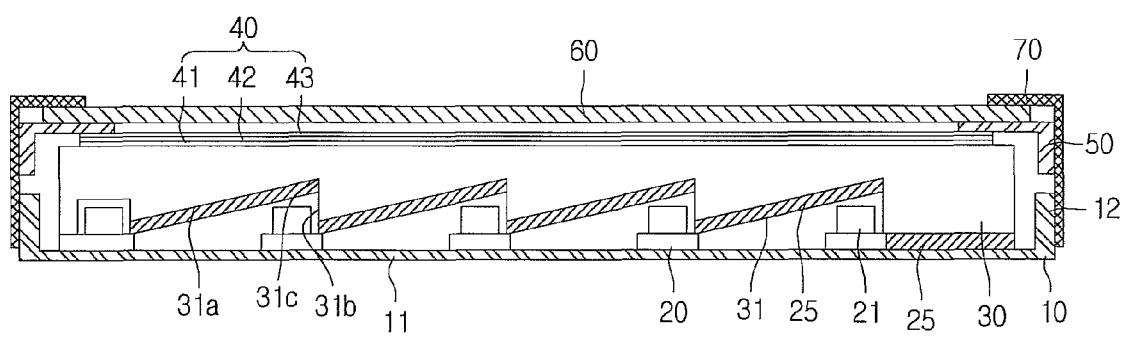
FIG. 4 is a sectional view showing the modification of the first embodiment.
Figure 5:
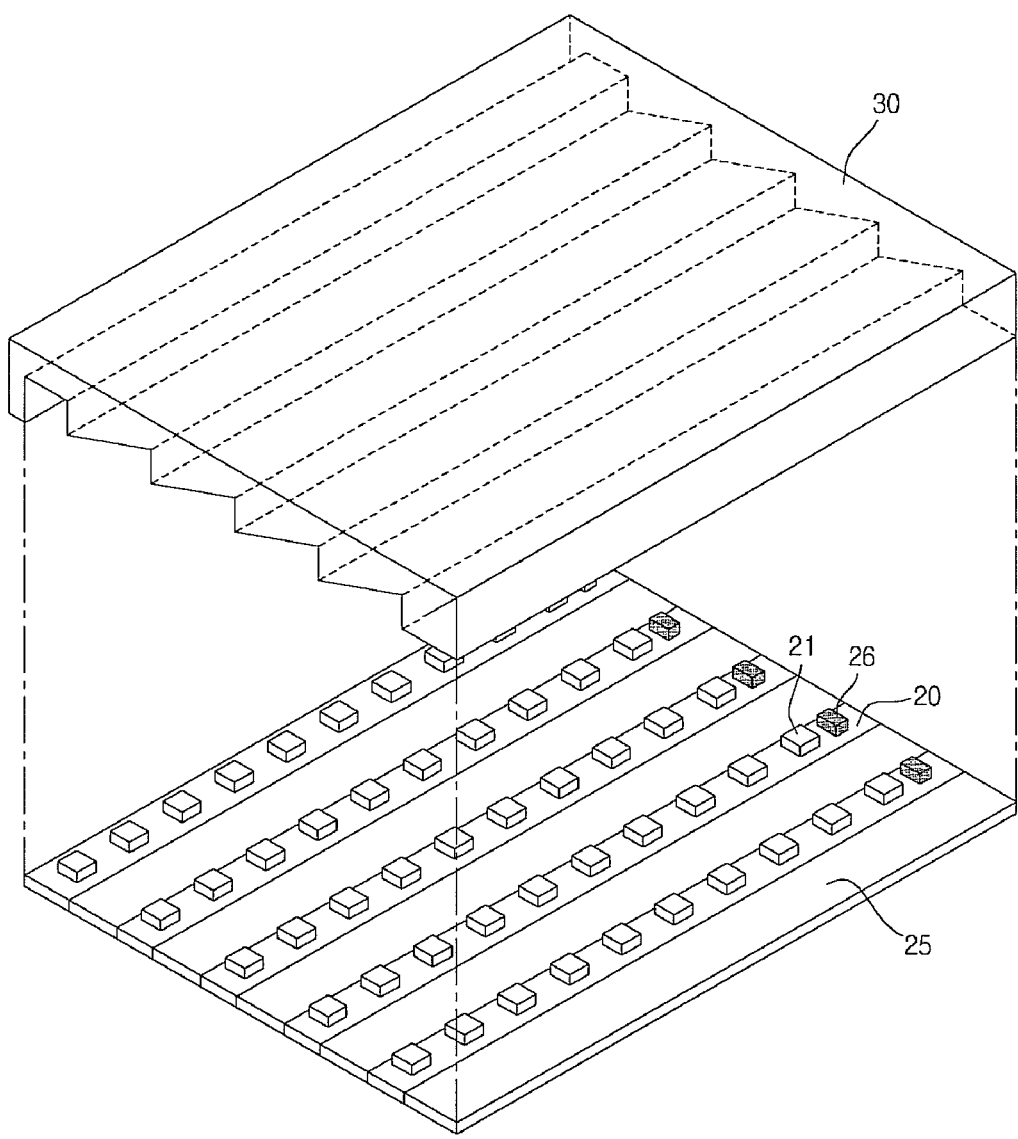
FIG. 5 is a perspective view showing a first example of use for the arrangement of a light emitting module of FIG. 1.

FIG. 1 is an exploded perspective view showing the display apparatus according to the first embodiment, and FIG. 2 is a sectional view showing the display apparatus taken along line I-I' of FIG. 1. FIG. 3 is a sectional view showing a simplified structure of the display apparatus of FIG. 2, and FIG. 4 is a sectional view showing the modification of the first embodiment. FIG. 5 is a perspective view showing a first example related to the arrangement of a light emitting module of FIG. 1.

The display apparatus according to the first embodiment includes a backlight unit and a display panel receiving a light from the backlight unit to display an image. Accordingly, hereinafter, the display apparatus will be described together with the backlight unit.

Referring to FIGS. 1 to 4, the display apparatus according to the first embodiment includes a bottom frame 10, and a light emitting module, a reflective sheet 25, and a light guide plate 30 provided in the bottom frame 10.

The display apparatus includes a light emitting part including the light emitting module, the reflective sheet 25, and the light guide plate 30 formed on the light emitting module and the reflective sheet 25, and includes an optical sheet 40 on the light guide plate 30, a display panel 60 on the optical sheet 40, and a top frame 70 on the display panel 60.

The bottom frame 10 includes a bottom surface 11 having the form of a rectangular plane having two longer sides facing each other and two shorter sides facing each other perpendicular to the two longer sides and four sidewalls 12 extending perpendicularly to the bottom surface 11.

The bottom frame 10 is coupled with a fixing member 50 formed on the optical sheet 40 to receive the light emitting module, the reflective sheet 25, the light guide plate 30, and the optical sheet 40 therein.

For example, the bottom frame 10 may include metal, or may have a plurality of convex parts (not shown) formed on the bottom surface 11 in order to increase rigidity.

The bottom surface 11 of the bottom frame 10 is provided thereon with a plurality of light emitting modules and the reflective sheet 25 that are alternately aligned with each other while extending in an X axis direction.

Each light emitting module has a bar type and includes a module substrate 20 extending in the X axis direction and a plurality of light emitting diodes 21 provided on the module substrate 20 while forming a row.

The module substrate 20 includes a metal core PCB, an FR-4 PCB, a typical PCB, a flexible substrate, or a ceramic substrate, and may include various substrates within the technical scope of the embodiment.

The module substrate 20 supplies power to each light emitting diode 21 in order to apply a light to the light guide plate 30, so that the light emitting diodes 21 can be individually driven.

The module substrate 20 is provided at one end thereof with a connector 26 used to supply power to the light emitting diodes 21 formed on the module substrate 20.

The connector 26 is electrically connected to the outside of the bottom frame 10, for example, a power supply or a PCB and a cable (not shown) formed on the rear surface of the bottom frame 10 through a cable drawing hole (not shown) formed in the bottom frame 10.

The cable drawing hole formed in the bottom frame 10 may be formed in the bottom surface 11 or the sidewall 12 of the bottom frame 10.

A plurality of heat sink members (not shown) may be additionally formed between the light emitting part and the bottom frame 10. If the heat sink members are formed inside the bottom frame 10, a cable drawing hole may be formed in the heat sink members.

The light emitting diodes 21 arranged on the module substrate 20 include side-view type light emitting diodes to emit lights in an inclined direction with respect to the module substrate 20, and are provided in recess parts 31 of the light guide plate 30 to emit lights to the lateral surfaces of the recess parts 31 of the light guide plate 30.

The light emitting diode 21 may be realized as a color LED or a UV LED to emit a light having at least one of red, blue, green, and white colors. In this case, the color LED may include a red LED, a blue LED, a green LED, or a white LED. The arrangement of the light emitting diodes 21 and the lights emitted from the light emitting diode 21 may vary within the technical scope of the embodiment.

Meanwhile, the reflective sheet 25 includes a reflective agent or a reflective metallic plate to reflect lights leaking from the light guide plate 30. The reflective sheet 25 is exposed among the module substrates 20. As shown in FIG. 2, a plurality of reflective sheets 25, which are spaced apart from each other, may be provided in gaps formed among the module substrate 20. Meanwhile, the display apparatus includes the light guide plate 30 provided on the light emitting modules and the reflective sheets 25 to diffuse or reflect lights emitted from the light emitting diodes 21 so that the lights are irradiated to the display panel 60 in the form of a surface light source.

The light guide plate 30 includes top and bottom surfaces. The top surface to form the surface light source is flat, and the bottom surface 11 is provided therein with the recess parts 31 to receive the light emitting diodes 21.

As shown in FIGS. 3 and 5, the recess part 31 has an edge-type sectional surface including a first surface 31*a*, a second surface 31*b*, and an intersection line 31*c* where the first and second surfaces 31*a* and 31*b* meet.

The first surface 31*a* may be inclined at a predetermined angle about the flat surface of the light guide plate 30, and the second surface 31*b* may perpendicular to the flat surface of the light guide plate 30.

The second surface 31*b* is an incident surface facing a lateral surface of the light emitting diode 21 to emit a light, and the inclined surface, which is the first surface 31*a*, guides a light, which is incident onto the second surface 31*b* serving as the incidence surface, to the top surface.

The intersection line 31*c* has a length identical to that of the recess 31 in a longitudinal direction of the recess 31. In other words, if one recess 31 receives a plurality of light emitting diodes 21 forming one row, the intersection line 31*c* has a length between one ends and an opposite ends of the light guide plate 30.

In this case, a recess part 34 (a circular dotted line of FIG. 3), which is positioned at an end portion provided in a direction opposite to the emission direction of a light of the light emitting diode 21 among the recess parts 31 positioned at end portions of the light guide plate 30, may have a rectangular sectional surface.

As shown in FIGS. 2 to 4, the light emitting diode 21 received in the recess part 31 of the light guide plate 30 is provided closer to the second surface 31*b* of the recess part 31 to emit a light through the second surface 31*b*. In addition, the reflective sheet 25 is formed below the first surface 31*a* of the recess part 31, and not formed at the second surface 31*b* serving as the light incidence surface.

In this case, the reflective sheet 25 may be formed on the first surface 31a serving as an inclined surface to guide a light as shown in FIG. 4. The reflective sheet 25 makes closely contact with the first surface 31a of the light guide plate 30 to reflect upward lights which are scatter-reflected in the light guide plate 30. In this case, the light guide area for the light emitting diode 21 provided in the last row of the light emitting part has no inclined surface, but has a flat surface like the top surface of the light guide plate 30. Accordingly, the reflective sheet 25 for the light guide diode 21 provided in the last row of the light emitting part may be formed below the flat surface of the light guide plate 30, that is, adjacent to the module substrate 20.

The recess parts 31 are formed in the bottom surface 11 of the light guide plate 30 as described above, and at least one light emitting diode 21 is provided in each recess part 31, thereby performing the division driving while providing improved light uniformity.

Meanwhile, a connector insertion recess (not shown) may be formed in the bottom surface 11 of the light guide plate 30 corresponding to the connector 26 on the module substrate 20. In contrast, the connector 26 may be received in one recess 31 together with the adjacent light emitting diode 21.

The light guide plate 30 is divided into a plurality of light emitting areas EA, and the size of each light emitting area EA varies depending on the number of light emitting diodes 21 of emitting lights to the related light emitting area EA.

In other words, as shown in FIG. 1, when the light emitting diodes 21 are individually driven, the light emitting area EA may be a part of the light guide plate 30 in which one light emitting diode 21 is placed. Differently, when the light emitting diodes 21 are simultaneously driven, the sum of the parts of the light guide plate 30 in which the simultaneously-driven light emitting diodes 21 are positioned may be defined as one light emitting area EA.

A body of the light guide plate 30 is not divided for each light emitting area EA, but is formed as one body to cover all the light emitting diodes 21 provided in the bottom frame 10.

In other words, although the light guide plate 30 includes a plurality of light emitting areas EA divided from each other, the light emitting areas EA are not physically divided, but simply divided such that the light emitting areas EA emit light according to the driving of the light emitting diodes 21 positioned at the relating light emitting areas EA. When bar-type light emitting modules are provided as shown in FIGS. 1 to 5, parts of the light guide plate 30 emitting lights by the light emitting modules can be defined as the light emitting areas EA. If the light emitting areas EA are defined along the row, advantages can be achieved when the impulsive driving scheme is employed.

When the light guide plate 30 corresponding to one screen of the display panel 60 is divisionally driven in the form of one body, dark lines caused by physically-divided light emitting areas EA may not occur in the light guide plate 30, and coupling parts are simplified, so that a slim backlight unit can be provided.

In addition, according to the present embodiment, division driving schemes such as a local dimming scheme, or an impulsive driving scheme are employed, so that power consumption not only be reduced, but the contrast of the screen is improved. Accordingly, the image quality of the display apparatus can be improved.

In addition, according to the present embodiment, the division driving scheme is performed by using the light guide plate 30 formed in one body, so that the distribution in the quantity of lights can be clearly adjusted through the divided light emitting areas EA. In addition, the light emitting diodes 21 are driven according to areas, so that lights having different brightness can be irradiated according to the divided light emitting areas EA. In addition, the display apparatus can represent superior image quality.

The light guide plate 30 includes a transparent material. For example, the light guide plate 30 may include one of an acrylic resin material such as PMMA (poly methyl methacrylate), PET (polyethylene terephthalate), PC (poly carbonate), and PEN (polyethylene naphthalate) resin.

The light guide plate 30 formed in one body may be formed through an injection molding scheme, or an extrusion molding scheme with respect to the display panel 60. The diffusion pattern (not shown) may be formed on the top surface of the light guide plate 30.

Meanwhile, the optical sheet 40 is provided on the light guide plate 30.

For example, the optical sheet 40 may include a first diffusion sheet 41, a prism sheet 42, and a second diffusion sheet 43. The first and second diffusion sheets 41 and 43 diffuse lights output from the light guide plate 30, and the diffused lights are collected into the light emitting areas EA by the prism sheet 42. In this case, the prism sheet 42 may selectively include a horizontal prism sheet and/or a vertical prism sheet, or at least one brightness enhancement film.

The optical sheet 40 may not be formed. Only one of the first and second diffusion sheets 41 and 43 can be formed or only one prism sheet 42 can be formed. The number of the optical sheets 40 and the types of the optical sheets 40 may vary depending on the required brightness characteristics.

The fixing member 50 is formed on the optical sheet 40.

The fixing member 50 is coupled with the bottom frame 10, so that the reflective sheet 25, the light emitting module, the light guide plate 30, and the optical sheet 40 can be coupled with the bottom frame 10 while closely making contact with the bottom frame 10, and supports the display panel 60.

For example, the fixing member 50 may include a synthetic resin material, or a metallic material.

The display panel 60 is provided on the fixing member 50.

The display panel 60 displays image information by lights irradiated from the light guide plate 30. For example, the display panel 60 may be realized by using a liquid crystal display panel. The display panel 60 may include an upper substrate, a lower substrate, and a liquid crystal layer interposed between the upper and lower substrates, and may further include polarization sheets closely making contact with the top surface of the upper substrate and the bottom surface 11 of the lower substrate, respectively.

The display panel 60 is divided into a plurality of display areas DA and driven corresponding to a local dimming scheme or an impulsive driving scheme. In this case, the display areas DA of the display panel 60 may correspond to the light emitting areas EA of the light guide plate 30 as shown in FIG. 3.

A top frame 70 is provided on the display panel 60.

The top frame 70 includes a front surface part provided at the front of the display apparatus and a side surface part which is bent perpendicularly to the front surface part and provided at the side of the display apparatus. The side surface part of the top frame 70 is coupled with the fixing member 50 by a coupling member such as a screw (not shown).

As shown in FIGS. 1 to 5, in the display apparatus according to the first example of the embodiment, the backlight unit including an integrated light guide plate 30 and a plurality of bar-type light emitting modules is subject to the division driving scheme corresponding to the divided display areas DA of the display panel 60.

Hereinafter, another arrangement of the light emitting modules will be described with reference to FIG. 6.

Figure 6:
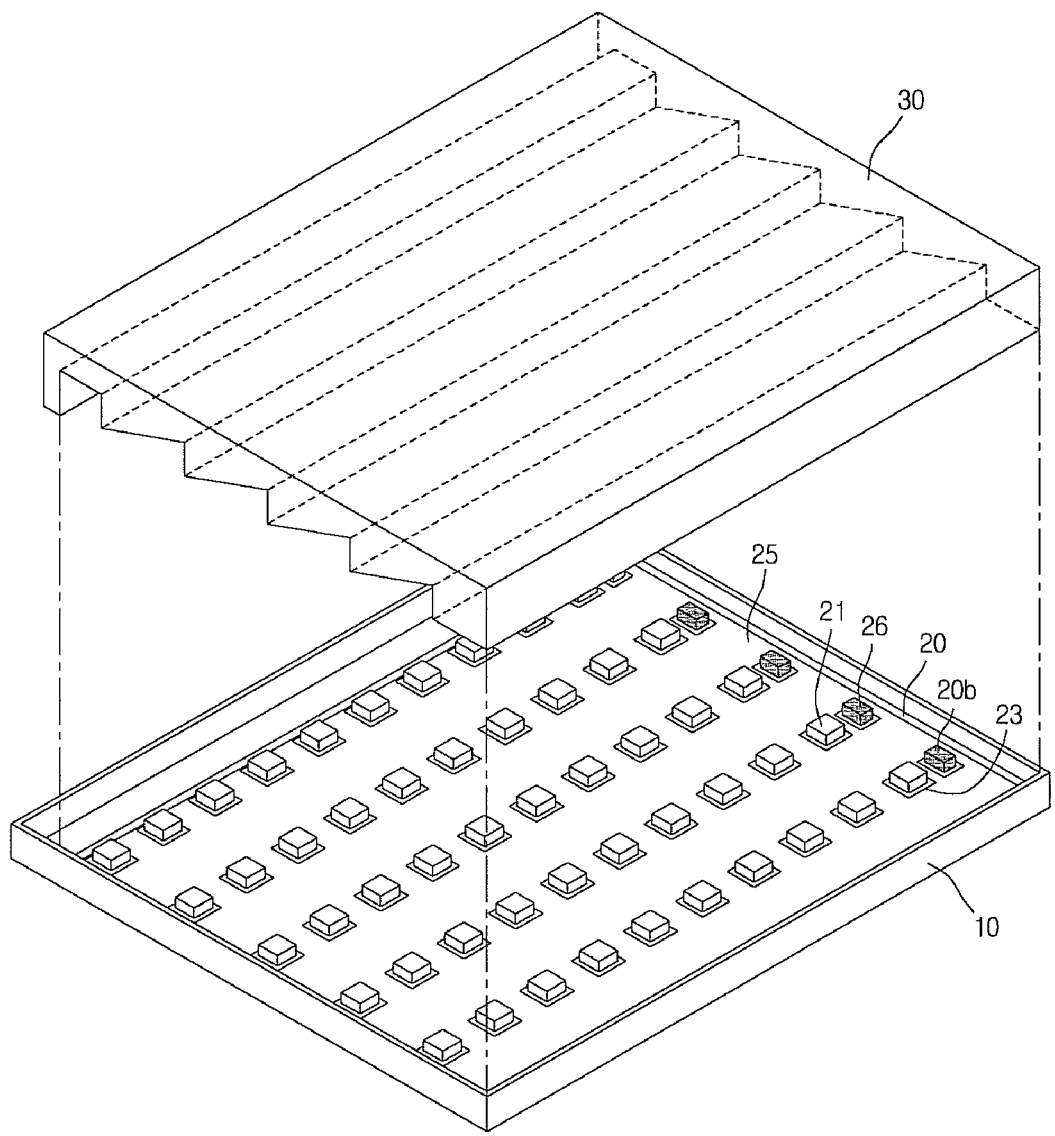
FIG. 6 is a perspective view showing a second example of use for the arrangement of the light emitting module of FIG. 1.

FIG. 6 is a perspective view showing a second example related to the arrangement of the light emitting module of FIG. 1.

Referring to FIG. 6, an integrated light emitting module is formed in the bottom frame 10 while covering the bottom surface 11 of the bottom frame 10.

The light emitting module includes an integrated light emitting substrate 20 provided in opposition to an integrated light guide plate 30 to cover the bottom surface 11 of the bottom frame 10.

The module substrate 20 includes a metal core PCB, an FR-4 PCB, a typical PCB, a flexible substrate, or a ceramic substrate, and may include various substrates within the technical scope of the embodiment.

The module substrate 20 is provided thereon with the light emitting diodes 21, which are arranged in the form of a matrix, and the connector 26.

In order to apply a light to the light guide plate 30, the module substrate 20 supplies power to the light emitting diodes 21, so that the light emitting diodes 21 can be individually driven.

The connector 26 is formed at the edge of the module substrate 20 to supply external power to the light emitting diodes 21 through printed circuits foamed in the module substrate 20.

In this case, the connector 26 supplies power to each group of the light emitting diodes 21 when the light emitting diodes 21 are divided into a plurality of groups according to the design of the printed circuit of the module substrate 20.

The connector 26 is electrically connected to the outside of the bottom frame 10, for example, a power supply or a PCB formed on the rear surface of the bottom frame 10 through a cable drawing hole (not shown) formed in the bottom frame 10.

The cable drawing hole formed in the bottom frame 10 may be formed in the sidewall 12 of the bottom frame 10.

A plurality of heat sink members (not shown) may be additionally formed between the light emitting part and the bottom frame 10. If the heat sink members are formed inside the bottom frame 10, a cable drawing hole may be formed in the heat sink members.

The light emitting diodes 21 arranged on the module substrate 20 include side-view type light emitting diodes to emit lights in an inclined direction with respect to the module substrate 20, and are provided in recess parts 31 of the light guide plate 30 to emit lights to the lateral surfaces of the recess parts 31 of the light guide plate 30.

Meanwhile, the module substrate 20 having one body are provided therein with a plurality of openings 23 to expose the light emitting diodes 21, and provided thereon with the reflective sheet 25 to cover the whole surface of the module substrate 20. Differently, the reflective sheet 25 may be formed in the form of a stripe below the inclined surface 30a of the recess part 31 of the light guide plate 30 between rows of the light emitting diode 21.

Meanwhile, the reflective sheet 25 includes a reflective agent or a reflective metallic plate to reflect lights leaking from the light guide plate 30 again.

Meanwhile, the display apparatus includes the light guide plate 30 provided above the light emitting modules and the reflective sheets 25 to diffuse or reflect lights emitted from the light emitting diodes 21 so that the lights are irradiated to the display panel 60 in the form of a surface light source. Hereinafter, an integrated light guide plate 30 will not be further described because the description about the integrated light guide plate 30 is the same as that of the light guide plate 30 shown in FIGS. 1 to 5.

As described above, when an integrated light emitting module provided under the integrated light guide plate 30 is used together with the integrated light guide plate 30, assembling can be simply performed, and the division driving can be performed through a circuit design inside the module substrate 20. In addition, the connection with the external power supply or the PCB can be performed by using only one connector 26.

Figure 7:
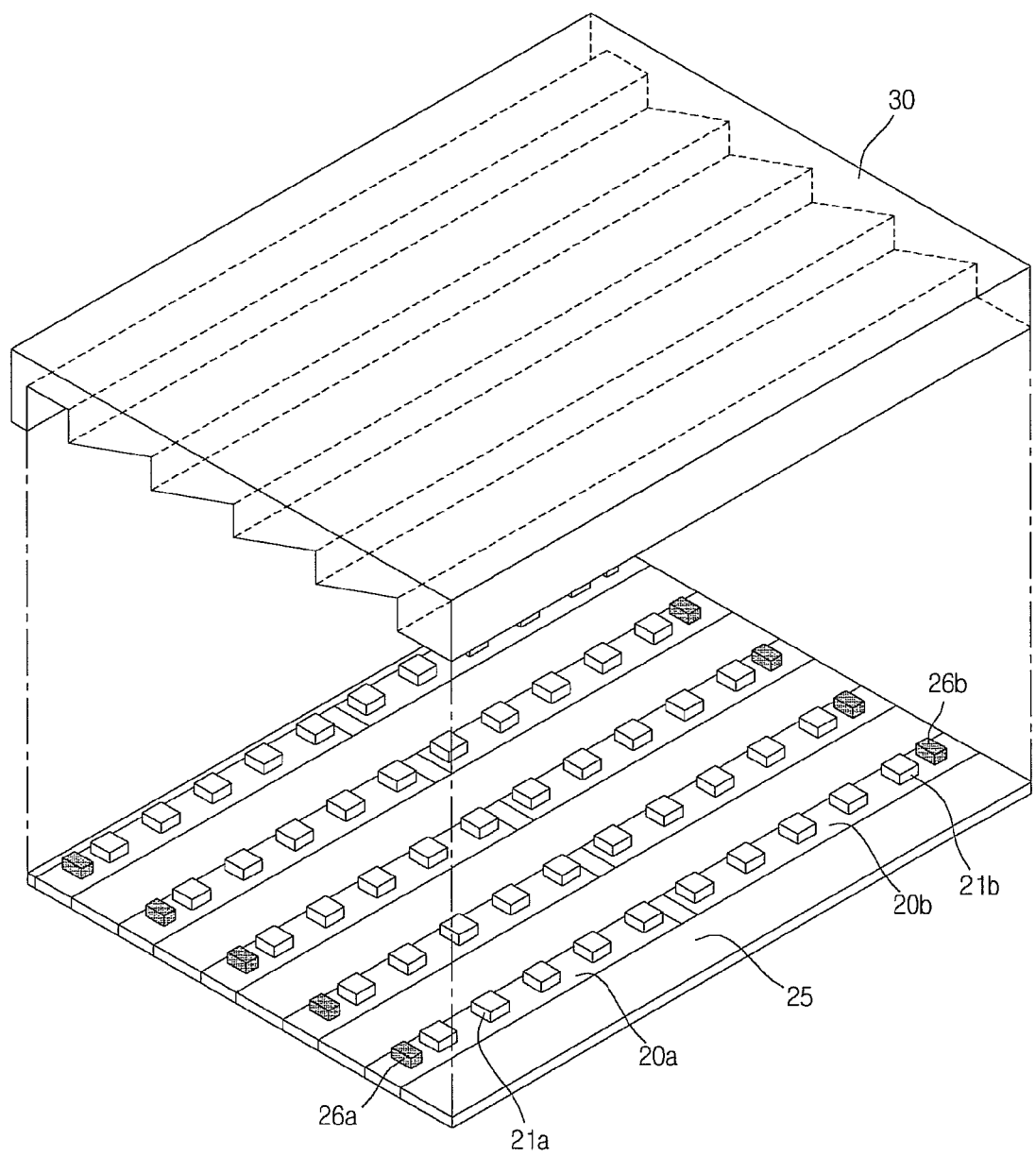
FIG. 7 is a perspective view showing a third example of use for the arrangement of the light emitting module of FIG. 1.

FIG. 7 is a perspective view showing a third example related to the arrangement of the light emitting module of FIG. 1.

According to the third example shown in FIG. 7, the bottom frame 10 is provided therein with a plurality of light emitting modules that are individually driven according to the light emitting areas.

Each light emitting module includes module substrates 20a and 20b and at least one of light emitting diodes 21a and 21b arranged on the module substrates 20a and 20b, respectively.

The module substrates 20a and 20b include a metal core PCB, an FR-4 PCB, a typical PCB, a flexible substrate, or a ceramic substrate, and may include various substrates within the technical scope of the embodiment.

FIG. 7 shows one example in which light emitting areas EA are defined by the light emitting diodes 21a and 21b arranged in half a row. If the light emitting areas EA are defined as described above, the light emitting diodes 21a and 21b are arranged on two module substrates 20a and 20b, respectively.

In this case, the module substrates 20a and 20b are provided at one ends thereof with connectors 26a and 26b, respectively, to simultaneously drive the light emitting diodes 21a and 21b arranged on the module substrates 20a and 20b, respectively.

As described above, the connectors 26a and 26b supply external power to the light emitting diodes 21a and 21b through circuits printed on the module substrate 20a and 20b.

In other words, the connectors 26a and 26b are electrically connected to the outside of the bottom frame 10, for example, a power supply or a PCB formed on the rear surface of the bottom frame 10 through a cable drawing hole (not shown) fanned in the bottom frame 10.

The light emitting diodes 21a and 21b arranged on the module substrates 20a and 20b, respectively, include side-view type light emitting diodes to emit lights in an inclined direction with respect to the module substrates 20a and 20b, respectively, and are provided in the recess parts 31 of the light guide plate 30 to emit lights to the lateral surfaces of the recess parts 31 of the light guide plate 30.

Meanwhile, the module substrates 20a and 20b are provided therein with a plurality of openings to expose the light emitting modules, and provided thereon with the reflective sheet 25 to cover the whole surface of the module substrates 20a and 20b. Differently, the reflective sheet 25 may be formed in the form of a stripe below the inclined surface 30a of the recess part 31 of the light guide plate 30 between rows of the light emitting diodes 21a and 21b.

Meanwhile, the display apparatus of FIG. 7 includes the integrated light guide plate 30 provided above the light emitting modules and the reflective sheets 25 to diffuse or reflect lights emitted from the light emitting diodes 21a and 21b so that the lights are irradiated to the display panel 60 in the form of a surface light source. Hereinafter, the description about the integrated light guide plate 30 will be omitted because the integrated light guide plate 30 has the same structure as that of the light guide plate according to the first embodiment.

As described above, when block-type light emitting modules divided according to the light emitting areas EA under the integrated light guide plate 30 are used together with the integrated light guide plate 30, the circuit design of the module substrates 20a and 20b for the division driving can be simplified, and the module substrates 20a and 20b can be simply driven when the division driving is performed.

Figure 8:
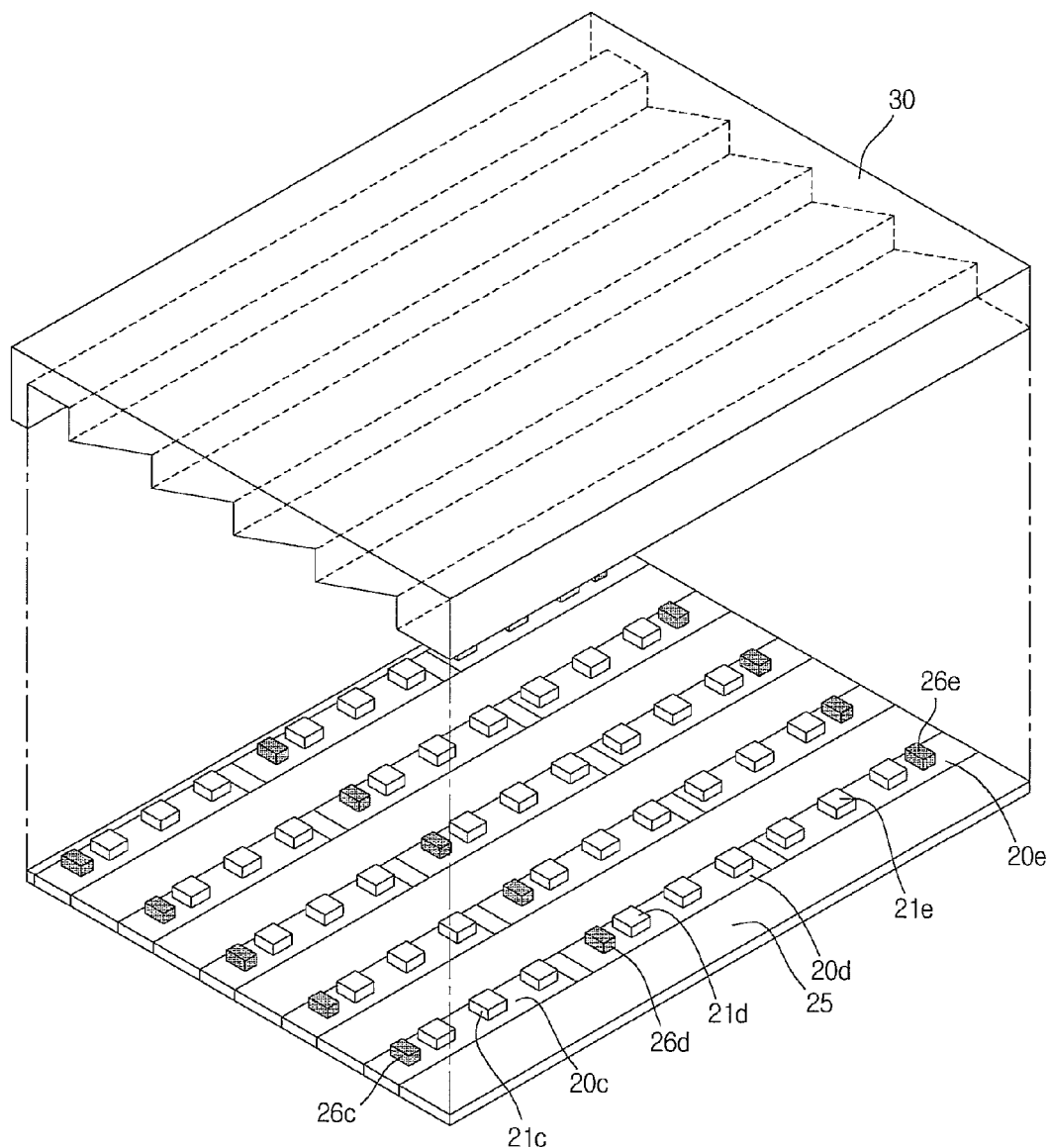
FIG. 8 is a perspective view showing a fourth example of use for the arrangement of the light emitting module of FIG. 1.

FIG. 8 is a perspective view showing a fourth example related to the arrangement of the light emitting module of FIG. 1.

According to the fourth example shown in FIG. 7, the bottom frame 10 is provided therein with a plurality of light emitting modules that are individually driven according to the light emitting areas EAs.

Each light emitting module includes module substrates 20c, 20d, and 20e and at least one of light emitting diodes 21c, 21d, and 21e arranged on the module substrates 20c, 20d, and 20e, respectively.

The module substrates 20c, 20d, and 20e include a metal core PCB, an FR-4 PCB, a typical PCB, a flexible substrate, or a ceramic substrate, and may include various substrate within the technical scope of the embodiment.

FIG. 8 shows one example in which the light emitting areas EA are defined by the light emitting diodes 21c, 21d, and 21e arranged in a ⅓ row, respectively. If the light emitting areas EA are defined as described above, the light emitting diodes 21c, 21d, and 21e arranged in one row of the light emitting part are divided onto three module substrates 20c, 20d, and 20e.

In this case, the module substrates 20c, 20d, 20e are provided at one ends thereof with connectors 26c, 26d, and 26e to simultaneously drive the related light emitting diodes 21c, 21d, and 21e arranged on the module substrates 20c, 20d, and 20e.

Each of the connectors 26c and 26e formed on the module substrates 20c and 20e provided at both edges in one row of the light emitting part are formed at the outermost portion of each of the module substrates 20c and 20e. The connector 26d formed on the module substrate 20d provided at the central portion of the row is formed at one end portion of the module substrate 20d.

As described above, the connectors 26c, 26d, and 26e supply external power to the light emitting diodes 21c, 21d, and 21e through circuits printed on the module substrate 20c, 20d, and 20e.

In other words, the connectors 26c, 26d, and 26e are electrically connected to the outside of the bottom frame 10, for example, a power supply or a PCB formed on the rear surface of the bottom frame 10 through a cable drawing hole (not shown) formed in the bottom frame 10.

In this case, the connector 26d of the module substrate 20d provided at the central portion of each row is connected to printed circuits of the adjacent module substrates 20c and 20e to receive power from the module substrates 20c and 20e.

The light emitting diodes 21c, 21d, and 21e arranged on the module substrates 20c, 20d, and 20e, respectively, include side-view type light emitting diodes to emit lights in an inclined direction with respect to the module substrates 20c, 20d, and 20e, respectively, and are provided in the recess parts 31 of the light guide plate 30 to emit lights to the lateral surfaces of the recess parts 31 of the light guide plate 30.

Meanwhile, the module substrates 20c, 20d, and 20e are provided therein with a plurality of openings to expose the light emitting modules, and provided thereon with the reflective sheet 25 to cover the whole surface of the module substrates 20c, 20d, and 20e. Differently, the reflective sheet 25 may be formed in the form of a stripe below the inclined surface 30a of the recess part 31 of the light guide plate 30 between rows of the light emitting diodes 21c, 21d, and 21e.

Meanwhile, the display apparatus of FIG. 8 includes the integrated light guide plate 30 provided above the light emitting modules and the reflective sheets 25 to diffuse or reflect lights emitted from the light emitting diodes 21c, 21d, and 21e so that the lights are irradiated to the display panel 60 in the form of a surface light source. Hereinafter, the description about the integrated light guide plate 30 will be omitted because the integrated light guide plate 30 has the same structure as that of the light guide plate according to the first embodiment.

As described above, when the block-type light emitting modules divided according to the light emitting areas EA under a integrated light guide plate 30 are used together with the integrated light guide plate 30, the circuit design of the module substrates 20c, 20d, and 20e can be simplified when performing division driving. Hereinafter, the division driving of the backlight unit will be described with reference to FIG. 8.

Figure 9:
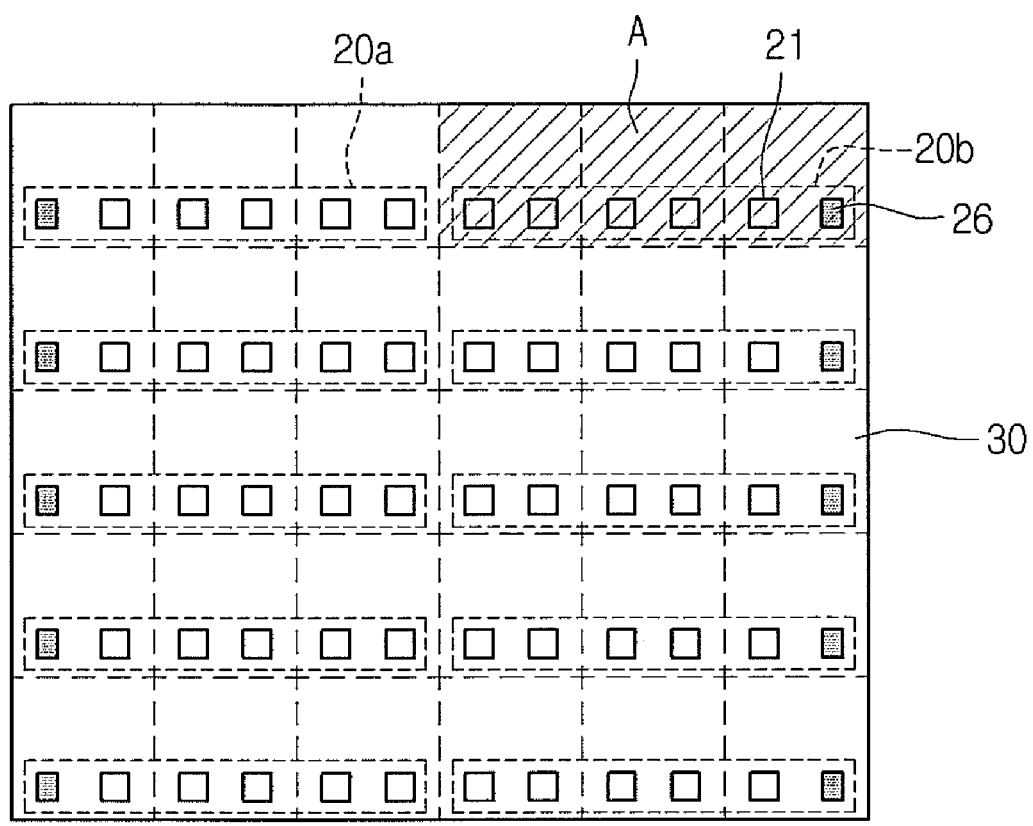
FIG. 9 is a plan view showing the division driving scheme of the backlight unit.

FIG. 9 is a plan view showing the division driving scheme of the backlight unit in the display apparatus according to the embodiment.

The backlight unit in the display apparatus shown in FIGS. 1 to 8 can be driven through a division driving scheme, and the division driving scheme may include a local dimming scheme or an impulsive scheme.

When the display apparatus is driven through the local dimming scheme, the display panel 60 is divided into a plurality of display areas. Accordingly, the light emitting part has a plurality of light emitting areas A.

As shown in FIG. 8, each light emitting area EA may be defined as a portion A of the light guide plate 30 in which the light emitting diodes 21 forming half a row are positioned.

However, the embodiment is not limited thereto. In other words, as shown in FIG. 1, the light emitting area EA of each light emitting diode 21 defines one light emitting area EA, or N, X, or M (N and N are integer numbers) light emitting diodes 21 may define one light emitting area EA.

If the portion A of the light guide plate 30 corresponding to the light emitting diodes 21 forming the half a row is defined as the light emitting areas EA as shown in FIG. 9, the light emitting modules of FIGS. 5 to 6 drive a plurality of light emitting areas EA by one connector 26. Accordingly, the connector 26 supplies power to one selected from the light emitting areas A.

Meanwhile, when the light emitting modules 20a to 20e and the connectors 26a to 26e are provided with respect to each light emitting area as shown in FIGS. 7 and 8, the division driving can be performed by supplying power through the connectors 26a to 26e of the related light emitting area EA.

In this case, the brightness of at least one light emitting diodes 21 provided in each light emitting area EA can be individually adjusted according to gray peak values of the light emitting areas EAs.

Meanwhile, when the display apparatus is driven through an impulsive driving scheme, the divided light emitting areas A can be sequentially turned on in synchronization with the display panel.

Hereinafter, a display apparatus according to the second embodiment will be described with reference to FIGS. 10 to 15.

Figure 10:
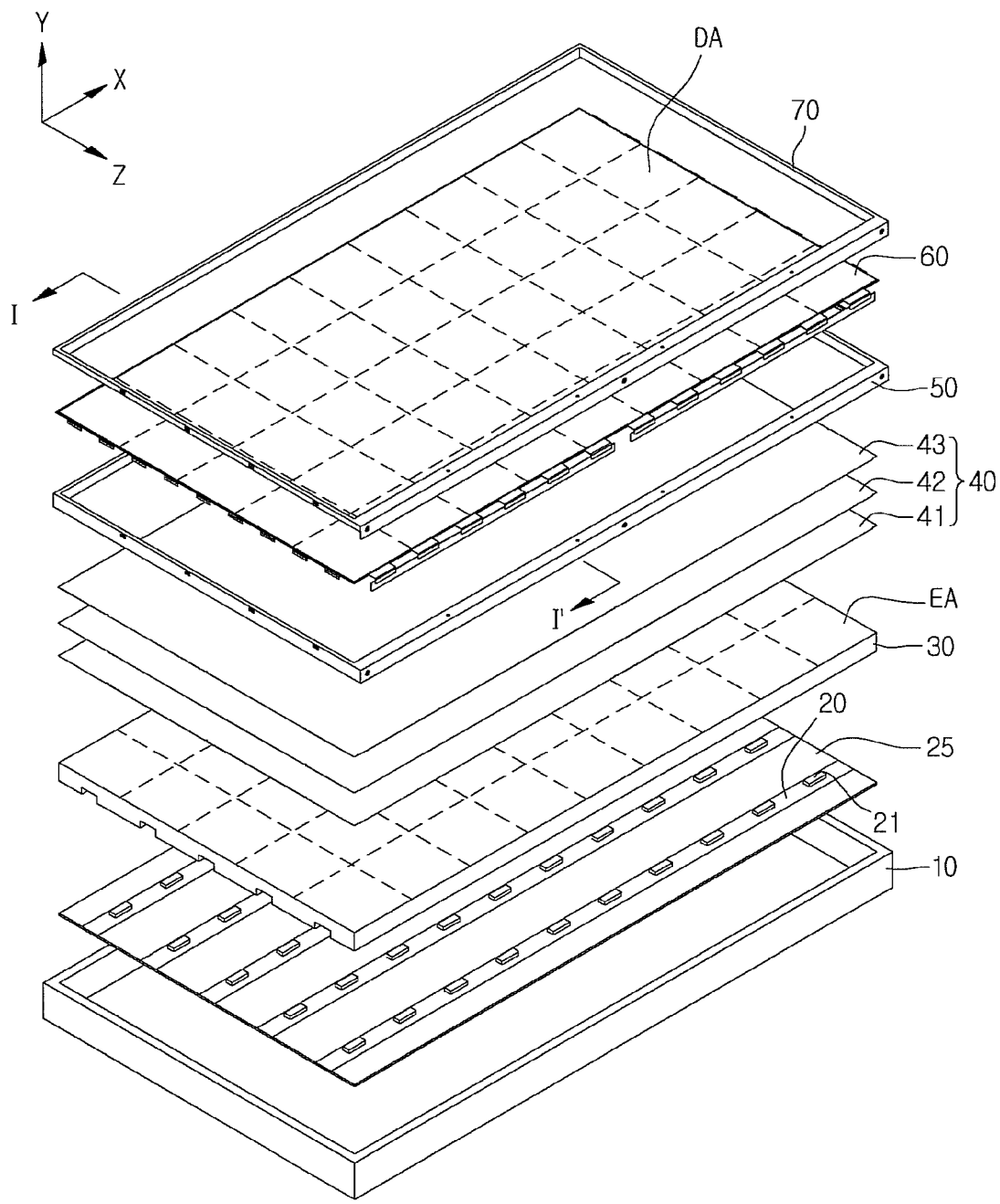
FIG. 10 is an exploded perspective view showing the display apparatus according to one example of the second embodiment.
Figure 11:
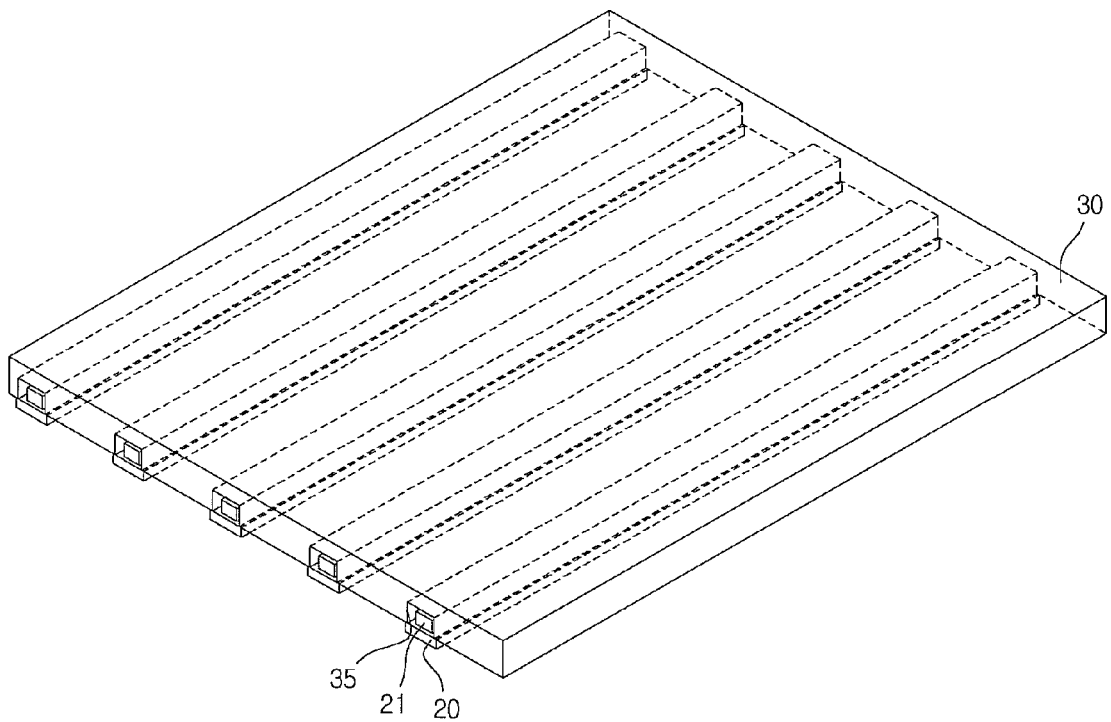
FIG. 11 is a perspective view showing the light emitting part of FIG. 10.
Figure 12:
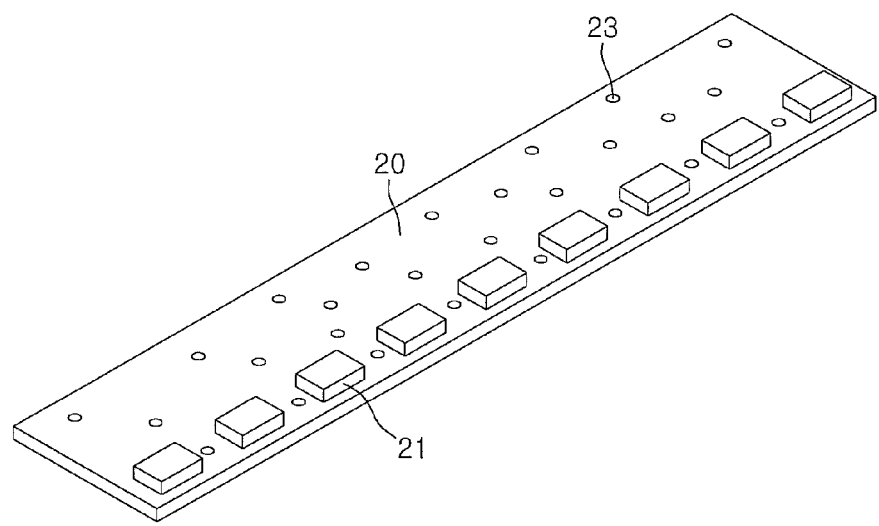
FIG. 12 is a perspective view showing the light emitting module of the display apparatus of FIG. 10.
Figure 13:
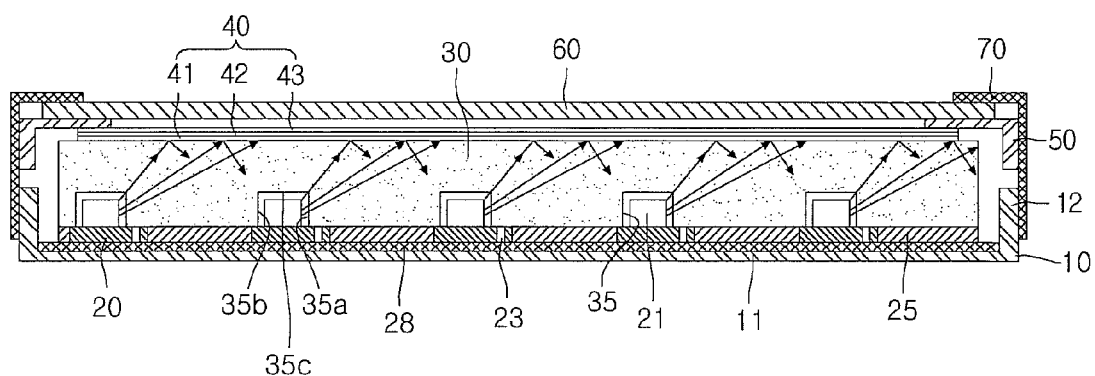
FIG. 13 is a sectional view which is taken along line I-I' and shows the display apparatus of FIG. 10.

FIG. 10 is an exploded perspective view showing the display apparatus according to one example of the second embodiment, and FIG. 11 is a perspective view showing the light emitting part of FIG. 10. FIG. 12 is a perspective view showing the light emitting module of the display apparatus of FIG. 10, and FIG. 13 is a sectional view which is taken along line I-I' and shows the display apparatus of FIG. 10.

Since the display apparatus according the second embodiment has the structure similar to that of the display apparatus according to the first embodiment, the same description will be omitted The display apparatus according to the second embodiment includes the bottom frame 10, the light emitting module formed in the bottom frame 10, the reflective sheet 25, and the light guide plate 30.

The bottom surface 11 of the bottom frame 10 is provided thereon with each light emitting module and the reflective sheet 25 which are alternately aligned with each other while extending in the X axis direction.

Each light emitting module is a bar type light emitting module, and includes the module substrate 20 extending in the X axis direction and the light emitting diodes 21 provided on each module substrate 20 while fowling one row.

The module substrate 20 includes a metal core PCB, an FR-4 PCB, a typical PCB, a flexible substrate, or a ceramic substrate, and may include various substrates within the technical scope of the embodiment.

The module substrate 20 supplies power to each light emitting diode 21 to individually drive the light emitting diode 21, so that the light from the light emitting diode 21 can be supplied to the light guide plate 30.

A plurality of openings 23 are formed n the module substrate 20.

Each opening 23 has a predetermined size. The openings 23 are irregularly distributed throughout the whole surface of the module substrate 20, and formed by perforating the module substrate 20.

Each opening 23 serves as a heat sink hole to discharge heat emitted from the light emitting diode 21 to the outside.

When the openings 23 are formed in the module substrate 20 as described above, a heat sink sheet 28 is formed below the module substrate 20 and the reflective sheet 25.

The heat sink sheet 28 may be formed throughout the whole bottom surface 11 of the bottom frame 10 as shown in FIG. 4, and may have the shape of a bar under the module substrate 20.

The openings 23 are irregularly formed on the whole surface of the module substrate 20 to transfer light emission heat to the heat sink sheet 28 formed under the module substrate 20, so that the light guide plate 30 can be prevented from being degraded.

In this case, metallic heat sink material may be filled in the opening 23 so that thermal conductivity can be increased.

When the opening 23 is filled with the heat sink material as described above, heat can be transferred through a conduction phenomenon as well as a convection phenomenon, so that more effective heat sink can be obtained.

As shown in drawings, the light emitting module may include a plurality of bar-type light emitting modules or may be provided in the form of a single substrate having a size corresponding to the whole surface of the bottom frame 10. Similarly, even if the light emitting module is provided in the form of the single substrate, the light emitting module may have the openings 23 irregularly formed on the whole surface of the bottom frame 10.

The light emitting diodes 21 arranged on the module substrate 20 include side-view type light emitting diodes to emit lights in an inclined direction with respect to the module substrate 20, respectively, and are provided in the recess parts 31 of the light guide plate 30 to emit lights to the lateral surfaces of the recess parts 31 of the light guide plate 30.

The light emitting diode 21 may be realized as a color LED or a UV LED to emit a light having at least one of red, blue, green, and white colors. In this case, the color LED may include a red LED, a blue LED, a green LED, or a white LED. The arrangement of the light emitting diodes 21 and the lights emitted from the light emitting diode 21 may vary within the technical scope of the embodiment.

The light guide plate 30 has no body divided according to the light emitting areas EA, but has one body to cover all the light emitting diodes 21 formed in the bottom frame 10.

The integrated light guide plate 30 has top and bottom surfaces. The top surface of the light guide plate 30 is flat to form a surface light source, and the bottom surface 11 of the light guide plate 30 is provided therein with a plurality of recesses 35 to receive the light emitting modules.

As shown in FIGS. 10 to 13, the recess part 35 has a flat type structure including a first surface 35a which is an incidence surface facing the lateral surface of the light emitting diode 21 to emit a light, a second surface 35b which is parallel to the light incidence surface and faces an opposite lateral surface of the light emitting diode 21, and a third surface 35c facing a top surface of the light emitting diode 21.

As shown in FIG. 13, the first surface 35a of the recess part 35 serves as the light incidence surface to receive a light from the lateral surface of the light emitting diode 21. The space region between the incidence surface and an adjacent recess part 35 serves as a light guide area, which is parallel to the top surface of the light guide plate 30 to guide the incident light to the top surface of the light guide plate 30.

The reflective sheet 25 is not formed at the recess part 35, but formed under the light guide area between the recess parts 35.

In this case, the distance between the light emitting diode 21 and the first surface 35a serving as the light incidence surface may be shorter than the distance between the light emitting diode 21 and the second surface 35b which is an opposite lateral surface to the first surface 35a.

As shown in FIG. 12, the recess part 35 of the light guide plate 30 may have the form of a tunnel to simultaneously receive a plurality of light emitting diodes 21 constituting one row. If the light emitting diodes 21 are divided into a plurality of blocks, one recess may be formed with respect to each block. The recess part 35 dedicated for an individual light emitting diode 21 may be formed.

In the display apparatus according to the second embodiment, the light guide plate 30 having one body is provided corresponding to the divided display areas DA of the display panel 60, and provided at a lower portion thereof with the module substrate 20 having the openings irregularly distributed thereon, so that heat can be discharged. Accordingly, the light guide plate 30 having one body can be prevented from being degraded.

Hereinafter, various applications according to the second embodiment will be described with reference to FIGS. 14 and 15.

Figure 14:
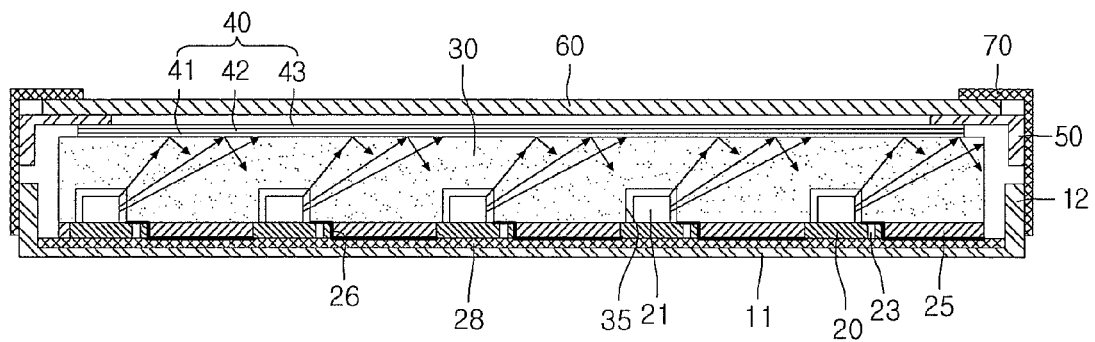
FIG. 14 is a sectional view showing a display apparatus according to another example of the second embodiment.

Since the module substrate 20 of the light emitting module has an area wider than that of the light emitting diode 21, a portion of the module substrate 20 may be positioned under the light guide area of the light guide plate 30 as shown in FIG. 14.

Even in the application shown in FIG. 14, the openings 23 are irregularly formed on the module substrate 20, so that the light emission heat of the light emitting diode 21 can be transferred to the heat sink sheet 28 formed under the module substrate 20.

In addition, an adhesive sheet 26 may be further provided to the contact area between the light guide area of the light guide plate 30 and the module substrate 20. The adhesive sheet 26 may cover the openings 23.

The adhesive sheet 26 has the form of a thin film, and includes a material which is the same as that of the reflective sheet 25 to reflect a light, so that the adhesive sheet 26 can ensure an adhesive property and reflectance. Such an adhesive sheet 26 may extend from the upper portion of the module substrate 20 to the lower portion of the reflective sheet 25 adjacent to the module substrate 20.

Since the integrated light guide plate 30 shown in FIG. 14 has the same structure as that of the integrated light guide plate 30 shown in FIG. 13, the details of the integrated light guide plate 30 of FIG. 14 will be omitted in order to avoid redundancy.

Figure 15:
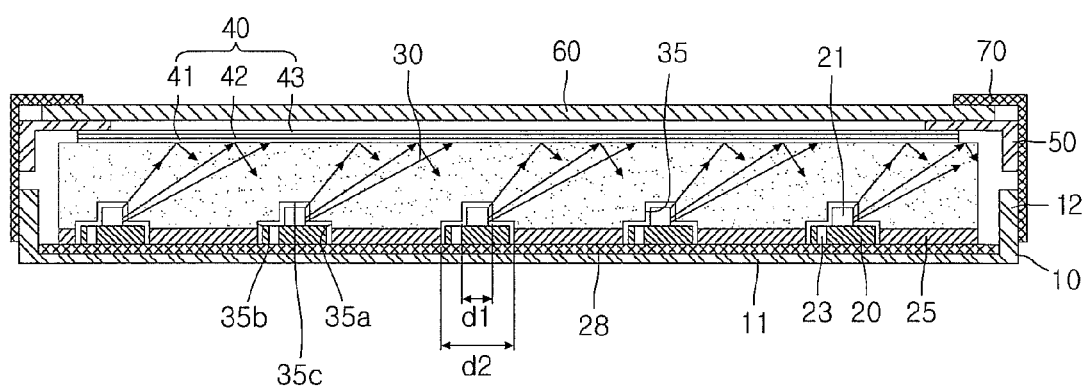
FIG. 15 is a sectional view showing a display apparatus according to still another example of the second embodiment.

Meanwhile, as shown in FIG. 15, the recess part 35 formed on the bottom surface 11 of the integrated light guide plate 30 shown in FIG. 10 may have a layer structure.

In other words, the sectional surface of the recess part 35 including the first, second, and third surfaces 35a, 35b, and 35c has the layer structure to receive both the light emitting diode 21 and the module substrate 20 of supporting the light emitting diode 21.

The recess part 35 has a first layer that is open toward the bottom surface 11 of the light guide plate 30 with a first width to receive the module substrate 20, and a second layer provided on the first layer and having a second width to receive the light emitting diode 21.

The second width of the second layer is equal to that of the third surface 35c, and the first width may be wider than the second width.

Although the recess part 35 has the layer structure including discrete lateral surfaces 35a and 35b, the embodiment is not limited thereto. The lateral surface extending from the second width d2 to the first width d1 can be consecutively open toward the bottom surface.

As described above, the recess part 35 of the light guide plate 30 has the layer structure, even if the module substrate 20 is filled in the recess part 35 of the light guide plate 30, the opening 23 may be irregularly formed throughout the whole surface of the module substrate 20.

Such the openings 23 transfer light emission heat emitted from the light emitting diode 21 inside the recess part 35 to the heat sink sheet 28, so that the light guide plate 30 can be prevented from being degraded. The opening 23 is filled with a heat sink material, so that heat sink effects can be more improved.

As described above, when the recess part 35 has the layer structure to bury the module substrate 20 to the light guide plate 30, the distance between the bottom frame 10 and the light guide plate 30 is shortened, so that the thickness of the display apparatus can be reduced. In addition, the light guide plate 30 and the light emitting module are aligned with each other in such a manner the light emitting module does not get out of the light guide plate 30 even if the light guide plate 30 is thermally expanded, and the openings 23 are formed in the module substrate 20 buried in the light guide plate 30, so that heat can be discharged. Accordingly, the thermal expansion of the light guide plate 30 can be reduced.

Hereinafter, the display apparatus having the integrated light guide plate 30 according to the third embodiment will be described with reference to FIG. 16.

Figure 16:
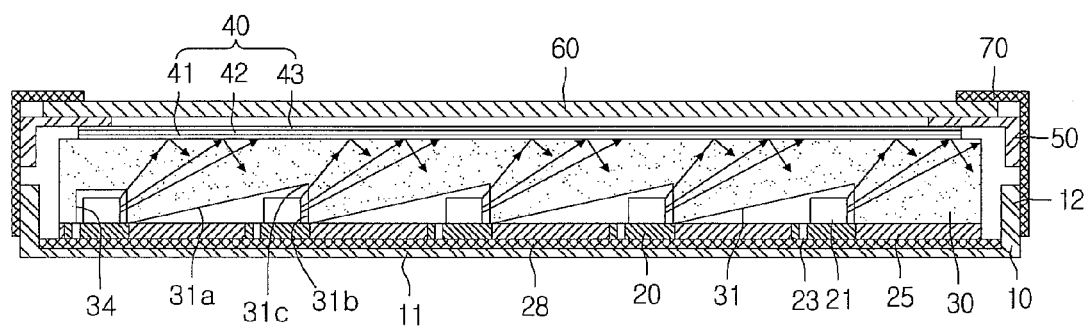
FIG. 16 is a sectional view showing a display apparatus according to a third embodiment.
Figure 17:
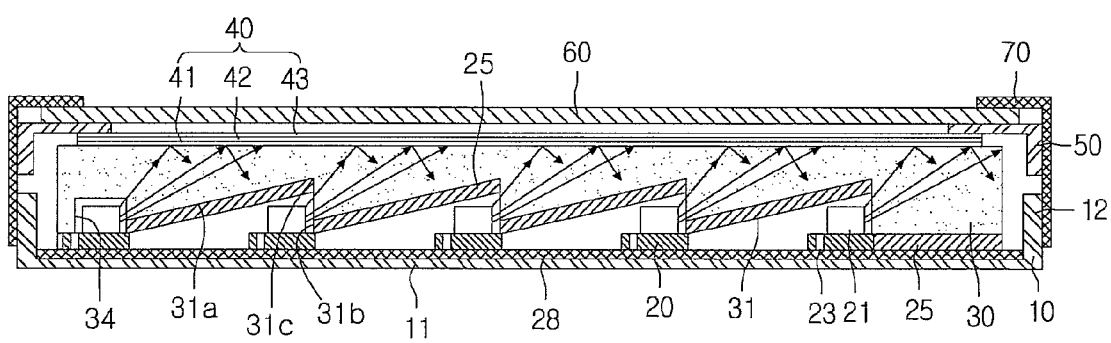
FIG. 17 is a sectional view showing the modification of the third embodiment.

FIG. 16 is a sectional view that shows the display apparatus of FIG. 10 and is taken along line I-I' according to the third embodiment, and FIG. 17 is a sectional view showing the modification of the third embodiment.

Similarly to the display apparatus shown in FIGS. 1 to 3, the display apparatus of FIG. 16 includes the optical sheet 40, the fixing member 50, the display panel 60, and the top frame 70 on the light guide plate 30, and the details thereof will be omitted in order to avoid redundancy.

The display apparatus shown in FIG. 16 includes the reflective sheet 25 on the bottom frame 10 and the light emitting module, and includes the light guide plate 30 to cover the reflective sheet 25 and the light emitting module.

The bottom frame 10 may include a metallic material, and the reflective sheet 25 and each light emitting module are formed on the bottom surface 11 of the bottom frame 10 while being alternately aligned with each other.

Each light emitting module includes the module substrate 20 and the light emitting diodes 21 formed on the module substrate 20.

The module substrate 20 includes a metal core PCB, an FR-4 PCB, a typical PCB, a flexible substrate, or a ceramic substrate, and may include various substrate within the technical scope of the embodiment.

The openings 23 are formed within the module substrate 20.

Each opening 23 has a predetermined size. The openings 23 are irregularly distributed throughout the whole surface of the module substrate 20, and formed by perforating the module substrate 20.

Each opening 23 serves as a heat sink hole to discharge heat emitted from the light emitting diode 21 to the outside.

When the openings 23 are formed in the module substrate 20 as described above, a heat sink sheet 28 is formed below the module substrate 20 and the reflective sheet 25.

The heat sink sheet 28 may be formed throughout the whole bottom surface 11 of the bottom frame 10, and may have the shape of a bar under the module substrate 20.

The openings 23 are irregularly formed on the whole surface of the module substrate 20 as described above to transfer light emission heat to the heat sink sheet 28 formed under the module substrate 20, so that the light guide plate 30 can be prevented from being degraded.

In this case, metallic heat sink material may be filled in the opening 23 so that thermal conductivity can be increased.

When the opening 23 is filled with the heat sink material as described above, heat can be transferred through a conduction phenomenon as well as a convection phenomenon, so that more effective heat sink can be obtained.

As shown in drawings, the light emitting module may include a plurality of bar-type light emitting modules or may be provided in the form of a single substrate having a size corresponding to the whole surface of the bottom frame 10. Even if the light emitting module is provided in the form of the single substrate, the light emitting module may have the openings 23 irregularly formed on the whole surface of the bottom frame 10.

The light emitting diodes 21 arranged on the module substrate 20 include side-view type light emitting diodes to emit lights in an inclined direction with respect to the module substrate 20, respectively, and are provided in the recess parts 31 of the light guide plate 30 to emit lights to the lateral surfaces of the recess parts 31 of the light guide plate 30.

Meanwhile, the integrated light guide plate 30 includes a flat top surface to supply the surface light source to the display panel 60 and a bottom surface 11 provided therein with the recess parts 31.

The recess part 31 is filled with both the light emitting diode 20 and the module substrate 20, and has an edge-type sectional surface including the first surface 31a, the second surface 31b, and the interconnection line where the first and second surfaces 31a and 31b meet.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
    a bottom frame having a bottom surface and a sidewall;
    a plurality of light emitting diodes defining a plurality of light emitting areas;
    at least one module substrate disposed on the bottom surface of the bottom frame and having a connector; and
    an integrated light guide plate covering the light emitting diode therein and being disposed on the light emitting areas corresponding to one screen;
    wherein the integrated light guide plate substantially contacts the at least one module substrate.

2. The backlight unit of claim 1, further comprising a plurality of recesses disposed in a bottom surface of the integrated light guide plate, wherein the light emitting diode and the module substrate are received in each recess so that a light is incident onto a lateral surface of the recess.

3. The backlight unit of claim 1, wherein the light emitting diodes disposed in one row are formed on one module substrate.

4. The backlight unit of claim 2, wherein the module substrate has a bar shape, and the module substrate is disposed at one end thereof with the connector.

5. The backlight unit of claim 3, further comprising a reflective sheet disposed between the module substrate having a bar shape and an adjacent module substrate.

6. The backlight unit of claim 1, further comprising an integrated module substrate corresponding to the integrated light guide plate and supporting all of the light emitting diodes.

7. The backlight unit of claim 6, wherein the integrated module substrate is disposed at an edge thereof with the connector.

8. The backlight unit of claim 7, further comprising a reflective sheet disposed on the integrated module substrate and having a hole to expose the light emitting diode.

9. The backlight unit of claim 7, wherein the light emitting diodes are divided into a plurality of groups, and the connector supplies power to each group.

10. The backlight unit of claim 1, wherein the light emitting diodes defining the light emitting area are formed on each module substrate.

11. A display apparatus comprising:
    a backlight unit including a bottom frame having a bottom surface and a sidewall, a plurality of light emitting diodes defining a plurality of light emitting areas, at least one module substrate disposed on the bottom surface of the bottom frame and having a connector and an integrated light guide plate covering the light emitting diode therein and being disposed on the light emitting areas corresponding to one screen; and
    a display panel disposed on the backlight unit and having one screen defined by a plurality of display areas,
    wherein the integrated light guide plate substantially contacts the at least one module substrate.

12. The display apparatus of claim 11, further comprising an integrated module substrate corresponding to the integrated light guide plate and supporting all of the light emitting diodes.

13. The display apparatus of claim 11, wherein the light emitting diodes defining the light emitting area are formed on each module substrate.

14. A backlight unit comprising:
    a bottom frame having a bottom surface and a sidewall;
    a plurality of light emitting diodes to provide a plurality of light emitting areas;
    a bar-shaped module substrate on the bottom frame, the bar-shaped module substrate having a connector at one end of the bar-shaped module substrate; and
    an integrated light guide plate to contact the bar-shaped module substrate and to be provided over the plurality of light emitting diodes and being disposed on the light emitting areas.

15. The backlight unit of claim 14, further comprising a plurality of recesses disposed in a bottom surface of the integrated light guide plate, wherein the light emitting diode and the module substrate are received in each recess so that a light is incident onto a lateral surface of the recess.

16. The backlight unit of claim 14, further comprising a reflective sheet between the bar-shaped module substrate and an adjacent bar-shaped module substrate.

17. The backlight unit of claim 14, further comprising an integrated module substrate corresponding to the integrated light guide plate and supporting all of the light emitting diodes.

18. The backlight unit of claim 17, wherein the integrated module substrate includes a connector at an edge of the integrated module substrate.

19. The backlight unit of claim 14, wherein the integrated light guide plate module to be provided over the plurality of light emitting diodes and being disposed on the light emitting areas corresponding to one screen.

* * * * *